(12) United States Patent
Kraus et al.

(10) Patent No.: US 11,732,844 B2
(45) Date of Patent: Aug. 22, 2023

(54) HYDROGEN STORAGE TANK AND FUEL CELL SYSTEM, AS WELL AS MOTOR VEHICLE HAVING SUCH A HYDROGEN STORAGE TANK AND FUEL CELL SYSTEM

(71) Applicants: VOLKSWAGEN AG, Wolfsburg (DE); AUDI AG, Ingolstadt (DE)

(72) Inventors: Maik Kraus, Magdeburg (DE); Ismail Levent Sarioglu, Braunschweig (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 21 days.

(21) Appl. No.: 15/866,427

(22) Filed: Jan. 9, 2018

(65) Prior Publication Data
US 2018/0195670 A1 Jul. 12, 2018

(30) Foreign Application Priority Data

Jan. 10, 2017 (DE) ...................... 10 2017 100 361.4

(51) Int. Cl.
F17C 11/00 (2006.01)
B60L 50/72 (2019.01)
H01M 8/04082 (2016.01)
F17C 1/00 (2006.01)
F17C 5/06 (2006.01)
H01M 8/04089 (2016.01)

(52) U.S. Cl.
CPC ............ F17C 11/005 (2013.01); B60L 50/72 (2019.02); F17C 1/005 (2013.01); F17C 5/06 (2013.01); H01M 8/04089 (2013.01); H01M 8/04201 (2013.01); H01M 8/04208 (2013.01); H01M 8/04216 (2013.01); F17C 2221/012 (2013.01); F17C 2270/0178 (2013.01); H01M 2250/20 (2013.01); Y02E 60/32 (2013.01); Y02T 90/40 (2013.01)

(58) Field of Classification Search
CPC .......... F17C 11/005; F17C 5/06; F17C 1/005; F17C 2221/012; F17C 2270/0178
USPC ............... 62/46.2; 206/0.7; 502/526; 96/108
See application file for complete search history.

(56) References Cited

U.S. PATENT DOCUMENTS

| 6,182,717 | B1* | 2/2001 | Yamashita | ....... B60K 15/03006 141/18 |
| 7,166,150 | B2* | 1/2007 | Torgersen | ............. C01B 3/0078 96/108 |
| 7,254,983 | B2* | 8/2007 | DaCosta | ............... C01B 3/0005 73/149 |
| 8,778,063 | B2* | 7/2014 | Mudawar | ............. C01B 3/0031 165/104.19 |
| 2003/0167923 | A1* | 9/2003 | Grote | .................... C01B 3/0005 96/108 |
| 2009/0107853 | A1* | 4/2009 | Tan | ....................... C01B 3/0015 206/0.7 |

(Continued)

FOREIGN PATENT DOCUMENTS

| CN | 1522224 A | 8/2004 |
| CN | 201193780 Y | 2/2009 |

(Continued)

Primary Examiner — Brian M King
(74) Attorney, Agent, or Firm — Seed IP Law Group LLP

(57) ABSTRACT

The invention relates to a hydrogen pressure tank using a metal hydride arranged in a porous matrix material. It is provided that the metal hydride is fixed in the structure of the matrix material.

8 Claims, 3 Drawing Sheets

(56) References Cited

U.S. PATENT DOCUMENTS

Figure 1:
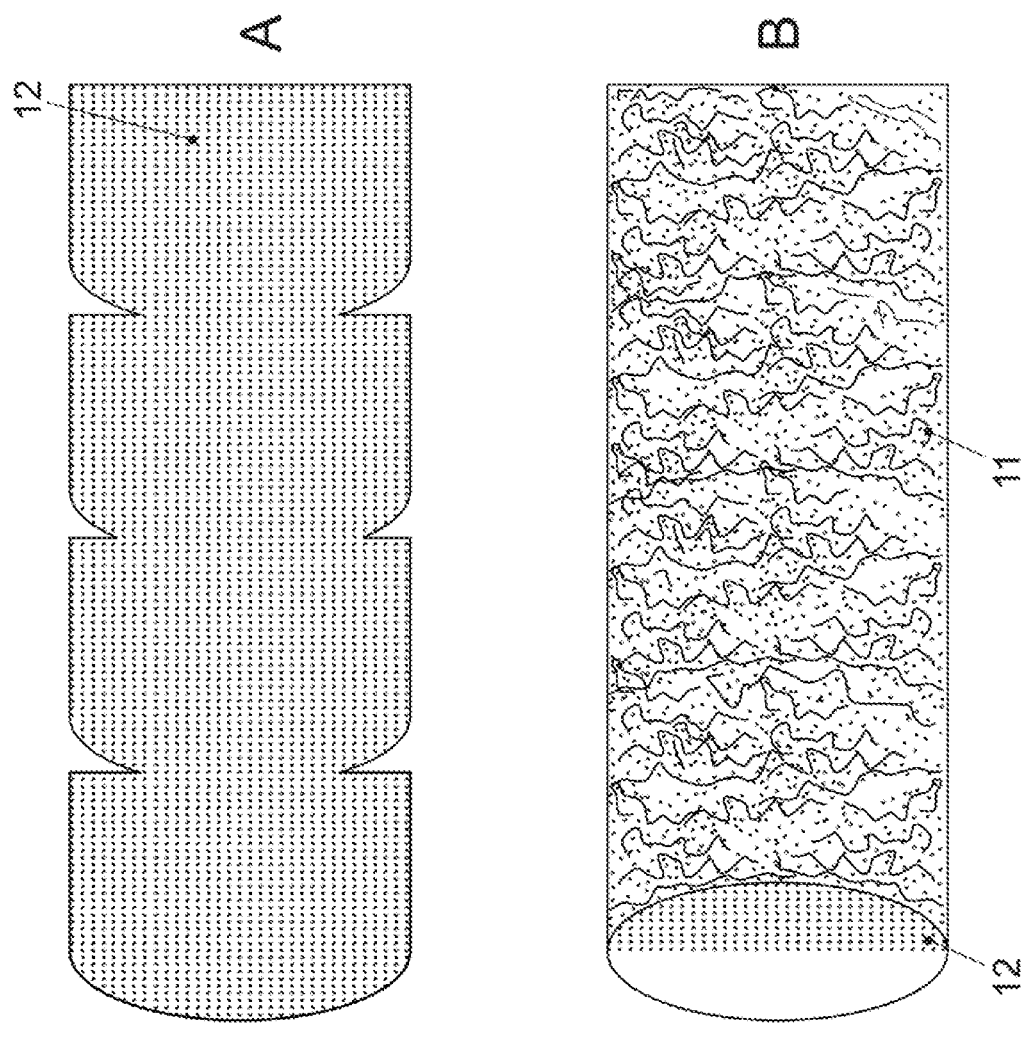

2011/0011803 A1* 1/2011 Koros .................... B01D 53/02
                                                           210/670
2015/0165415 A1* 6/2015 Inubushi ............... F17C 11/005
                                                           546/2

FOREIGN PATENT DOCUMENTS

| CN | 101507027 A | 8/2009 |
| DE | 10 2017 100 361 A1 | 7/2018 |

* cited by examiner

HYDROGEN STORAGE TANK AND FUEL CELL SYSTEM, AS WELL AS MOTOR VEHICLE HAVING SUCH A HYDROGEN STORAGE TANK AND FUEL CELL SYSTEM

The invention relates to a hydrogen storage tank to supply a fuel cell, as well as a fuel cell system, and a motor vehicle having such a hydrogen storage tank and fuel cell system.

Fuel cells are known. They are also used in motor vehicles in the search for ever more environmentally friendly motor vehicle drive trains. In addition to this, the use in conventional drivetrains is also being examined. Presently, three storage technologies for hydrogen are hereby available: the hydrogen pressure tank, in which compressed, gaseous hydrogen is stored at 35 MPa or 70 MPa (at 350 bar or 700 bar); the cryogenic tank for liquid hydrogen present at −253° C.; and what is known as metal hydride storage. In the latter, hydrogen may be stored over a wide operating range with regard to pressure and temperature and be released again from the storage hydride. However, with these storages it is disadvantageous that they on the one hand have a high weight, and on the other hand the chemical processes that lead to the absorption and desorption of the hydrogen proceed relatively slowly, and thus are essentially achieved under environmental conditions that are atypical for motor vehicles.

Metal hydrides are either constructed like salts or resemble solutions of hydrogen in metal or alloys. Hydrogen molecules are thereby initially adsorbed on the surface of the metal and then integrated into the metal lattice as elementary hydrogen. A quite brittle metal hydride is thereby created that, however, is insensitive to air and water. Different metals may take up hydrogen better or worse, such that the take-up capability per cubic centimeter of metal varies from 20 to 600 cubic centimeters of gaseous hydrogen. Given the same volume, more hydrogen may be stored in metal hydride than is taken up by hydrogen in liquid form. Technically, metal hydrides are used primarily in metal hydride storages for hydrogen. However, they are also found in metals that have been exposed to hydrogen for longer, since they form there inadvertently.

The mechanism of the take-up of hydrogen was long unknown, since the take-up of hydrogen in the previously known metal hydrides altered the crystal structure and thus made modeling and theoretical calculations impossible. However, the $LaMg_2Ni$ alloy has a strongly ordered crystal structure that is maintained even after hydrogen take-up. It could thereby be established that the hydrogen atoms penetrate into the metal lattice via the regular interstices and respectively appropriate one of the freely mobile electrons in the alloy. In this way, the hydrogen atoms chemically bond with the nickel atoms: Isolated $NiH_4$ molecules are created. The concentration of the absorbed hydrogen strongly depends on the number of free electrons of the alloy.

Hydrogen storages that are partially filled with a chemical storage material for hydrogen are known from EP 0 891 294 B1, WO 2006/046248 A1 and EP 1384 940 A2. An further metal hydride storage is described in WO 2001/85604 A1. US 2006/0118201 A1 proposes a mobile hydrogen supply unit that contains both pressure vessel for gaseous hydrogen and metal hydride hydrogen storage.

In US 2012/0 312 701 A1, a hydrogen pressure tank is additionally described that comprises aluminum foam. The aluminum foam has the function of increasing the thermal conductivity. However, aluminum foam is very expensive and not flexible.

Typically, metal hydrides used as hydrogen storages are compressed under pressure and, for example, arranged in tablet form in a hydrogen storage.

The combination of hydrogen storage under pressure and as metal hydride is already known, wherein the metal hydride (MH) is most often stored loose, or pressed into a graphite composite. For this method, two grave disadvantages arise precisely given automotive applications. On the one hand, a loose packed bed storage of the MH may result in a discharge in the form of particles from the tank system into the fuel cell system. On the other hand, given compacted graphite-metal hydride composites, decomposition of the matrix-metal hydride composite occurs over time due to vibration and due to the cyclical volume change as a result of charging and discharging the storage. On the one hand, the active metal hydride surface may therefore be reduced—the thermal transfer within the metal hydride may degrade if the metal hydride particles are completely surrounded by the matrix; and on the other hand, both small matrix and metal hydride particles may here again be transported with the extraction flow in the direction of a consumer, for example a fuel cell.

The invention is now based on the object of remedying or at least reducing the disadvantages of the prior art. In particular, a possible storage of hydrogen for fuel cell systems should be provided that enables a more stable and safe handling with simultaneously increased amount of storage per volume unit.

This object is achieved by a hydrogen pressure tank and a fuel cell system with the features of the independent claims.

A first aspect of the invention thus relates to a hydrogen pressure tank to provide hydrogen for a fuel cell system. The pressure tank comprises a pressure-resistant storage container, a metal hydride arranged inside the storage container for bonding hydrogen, and a porous matrix material. According to the invention, the metal hydride is thereby fixed in the structure of the matrix material and/or in its pores.

That has the advantage that the metal hydride is not loosely stored in the pressure tank, and therefore is stabilized. This stabilization prevents metal hydride present in particulate form from escaping in an uncontrolled manner from the pressure tank. Rather, the metal hydride is held in the pressure tank even given gas flows and spontaneous pressure reduction.

The structure of the porous matrix material additionally opens up the possibility to likewise use the free pores of compressed matrix material as a hydrogen storage upon pressure charging. For this, the hydrogen pressure tank is placed under pressure, whereby the foam is compressed with the unblocking of interstices, and additional compressed hydrogen is stored in the interstices. This embodiment enables the combination of two storage types, namely hydrogen storage by increasing the gravimetric energy density with simultaneous increase of the volumetric energy density. In other words, the hydrogen is on the one hand stored directly in the form of compressed gas, via compression of its volume. On the other hand, the hydrogen is stored via incorporation into a substrate material present as a solid, which is linked with an increase in its mass.

What is presently to be understood by "porous" is a material which has macroscopic pores that are in particular connected to channels in at least one dimension.

Figure 4:
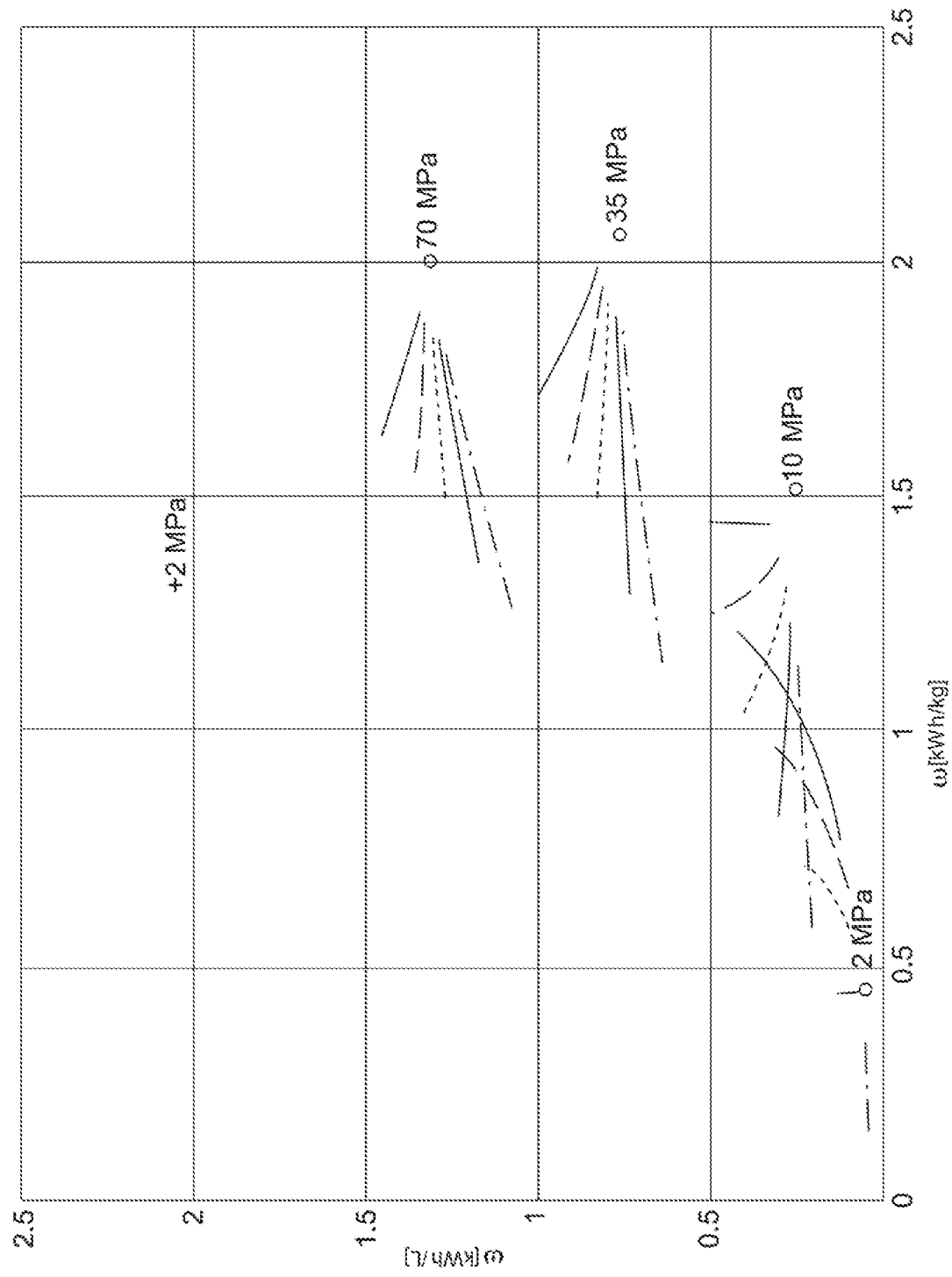

For this, the hydrogen pressure tank preferably has a pressure in a range from 10 MPa or [sic] 70 MPa (100 bar to 700 bar), in particular in a range from 35 MPa to 70 MPa (350 bar to 700 bar). As FIG. 4 shows, the combination of both storage methods already yields a synergistic effect at the lower boundary, in the range from 10 to 40 MPa (100 to 400 bar). The aforementioned interval of 35 to 70 MPa (350 to 700 bar) was previously established for the storage of gaseous hydrogen in motor vehicles, and therefore is preferred. The charging of the pressure tank according to the invention with such pressures opens the possibility of a multiplication of the gravimetric energy density by more than an order of magnitude, while the volumetric energy density is simultaneously increased by a multiple (see in this regard FIG. 4).

It has been shown that the storage capability responds proportionally to the pore size of the matrix material, meaning that the possible increase of the gravimetric energy density rises with increasing pore size.

The matrix material is particularly advantageously present in a two-dimensional or three-dimensional mesh structure, or as a foam. Both the external mechanical vibrations and the internal volume changes may be compensated for via such a three-dimensional mesh-web structure. The three-dimensional structure is stable in terms of tension and compression. In other words, given a compression of the matrix material charged with metal hydride, and given its unloading or due to vibrations which are connected with a tensile force on the structure, the metal hydride remains fixed without thereby forfeiting its compressibility. The metal hydride is elastically fixed by the matrix structure, so to speak. Moreover, the matrix material itself is elastic and therefore more stable with regard to aforementioned conditions if it is present in a foam structure or mesh structure. The foam structure in particular also has the advantage that the matrix material is always connected in three dimensions, and therefore is inherently stable against fracture.

Such a mesh structure additionally improves the heat transfer and increases the pressure stability, for example of a cylinder. This leads to a possible savings on material, for example CFRP (carbon fiber-reinforced plastic) in a wall of the pressure tank.

The incorporation of the metal hydride into a matrix material which forms open-pored foams is particularly preferred. As depicted in FIG. 1, the metal hydride particles are then stored in the webs of the open-pored foam.

In a preferred embodiment, it is provided that the matrix material is permeable to hydrogen. This enables the combination described above of the two storage techniques, since the portion of hydrogen that is not presently bound in the metal hydride may diffuse through the matrix material and distribute optimally. In both the release and bonding of bound hydrogen and in the storage and release of gaseous hydrogen, the hydrogen transport is then not limited to channels that result from the pores of the matrix material; rather, hydrogen transport directly via diffusion through the matrix material is also possible. That is in turn linked with an improved provision time of the hydrogen.

The matrix material is particularly preferably a polymer, in particular an elastomer, a thermoplastic or a thermoplastic elastomer. Such polymers can foam well and in particular, in comparison to thermosetting plastics, are characterized by a dimensional variability given pressure changes that, in the sense of the invention, is significant for an increase of the energy density as a result of a pressure increase. The cited materials are stable even given cyclical pressure changes and vibrations.

In physics, energy density designates the distribution of energy E in a defined size X, and consequently always takes the form of $$\omega = \frac{dE}{dX}.$$

It is most frequently used as volumetric energy density, a measure of the energy per spatial volume of a material (SI unit: joule per cubic centimeter), or gravimetric energy density or specific energy, a measure of the energy per mass of a substance (SI unit: joule per kilogram).

Alternatively, it is preferred that the matrix material is an additional metal hydride. This offers the advantage that the volume provided for storage inside the pressure tank is increased since the matrix material itself bonds hydrogen. In other words, no volume must be provided for the matrix material.

The additional metal hydride present as a porous matrix material and the metal hydride present in particulate form are comprised of the same material.

The particulate metal hydride and/or the metal hydride present as a matrix material is preferably a sodium alanate, thus sodium aluminum hydride. This is in particular characterized by high storage capacity and low weight. An additional advantage of sodium alanates is the operating temperature range of the metal hydride. A charging and discharging may thus occur at vehicle-specific temperatures (−40-120° C.).

The invention also relates to a fuel cell system having or connected with a hydrogen pressure tank according to the invention, as well as a motor vehicle having such a system. The hydrogen pressure tank according to the invention has a higher storage capacity, given the same volume, than a conventional hydrogen pressure tank. Moreover, it shows less leakage, in particular of metal hydride particles. The hydrogen pressure tank is connected to the fuel cell via a fuel line.

Additional preferred embodiments of the invention arise from the remaining features stated in the dependent claims.

The various embodiments of the invention mentioned in this application may be combined advantageously with one another unless stated otherwise in individual cases.

Figure 2:
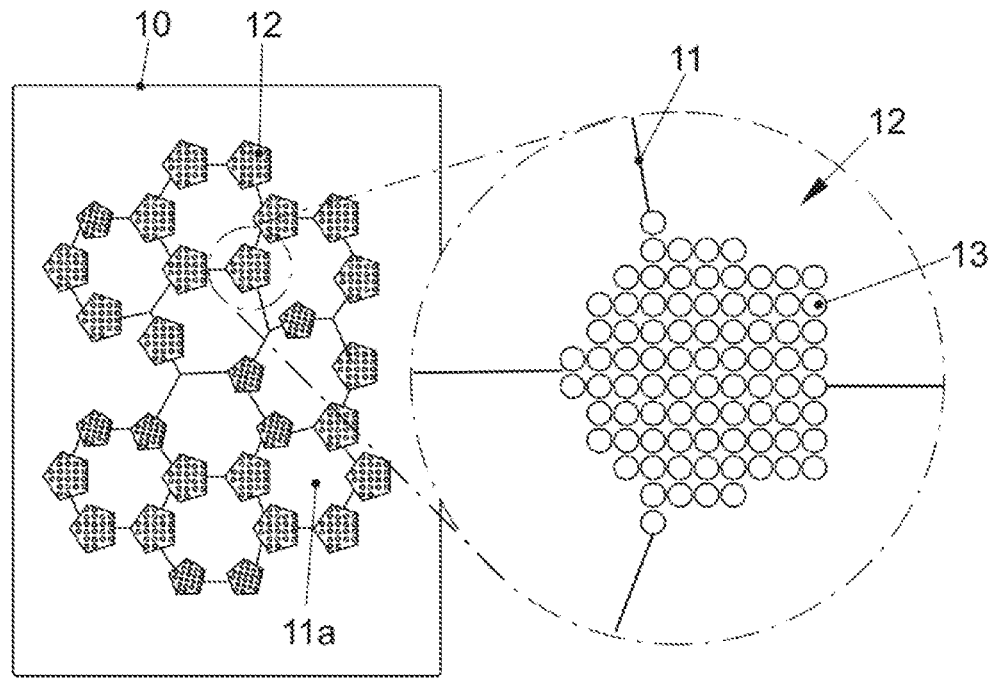
Figure 3:
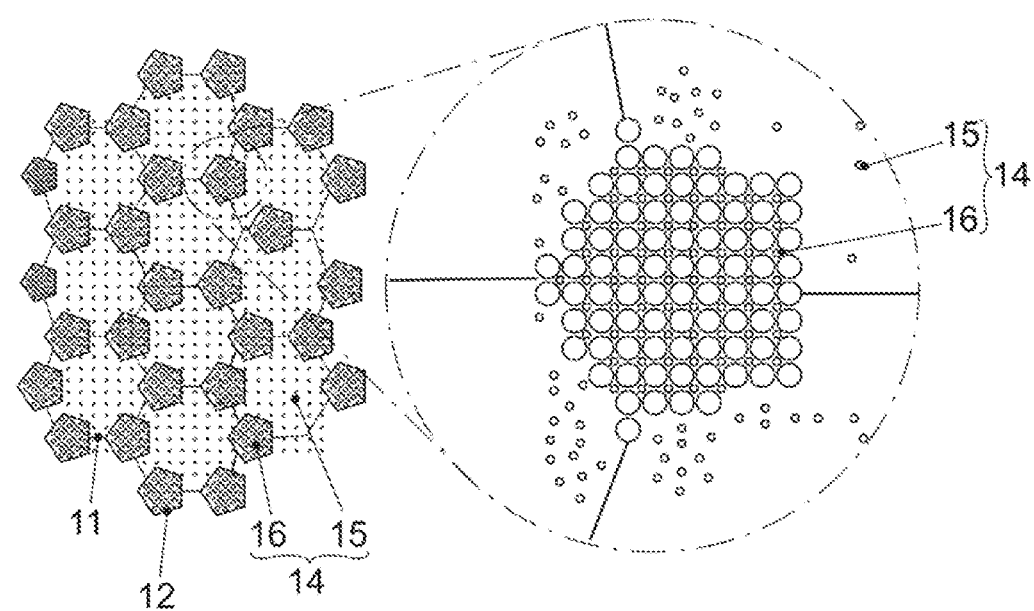

The invention will be explained below in exemplary embodiments with reference to associated Figures. The following is shown:

FIG. 1 a schematic depiction of a metal hydride storage according to the prior art (A), and in a preferred embodiment of the invention, FIG. 2 a schematic depiction of a matrix material of the hydrogen pressure tank in a preferred embodiment, in the uncharged state, FIG. 3 a graphical depiction of the matrix material in the preferred embodiment, charged with hydrogen, and FIG. 4 a graphical depiction of the volumetric versus the gravimetric energy density depending on the storage pressure in a hydrogen pressure tank, in different embodiments of the invention.

FIG. 1 shows a metal hydride hydrogen storage for a hydrogen tank according to the prior art (A), and in a preferred embodiment of the invention (B). Partial depiction (A) shows the pressing of a metal hydride 12 into tablet form. The metal hydride 12 is hereby stabilized only by its densest packing. It fractures easily, and loses individual metal hydride particles which might then leave the hydrogen tank. In the embodiment according to the invention, the metal hydride 12 is stabilized or elastically fixed in a matrix material 11. In the preferred embodiment shown in FIG. 1(B), the matrix material 11 is present as a foam.

FIGS. 2 and 3 shows a portion of a content of a hydrogen storage tank 10 in a preferred embodiment of the invention. This comprises a matrix material 11 that, in the shown embodiment, forms a three-dimensional mesh structure. Preferred polymers, in particular polymers that are deformable via pressure and/or temperature, are used as a matrix material. The matrix material is also preferably permeable to hydrogen. Alternatively, the matrix material 11 itself is present as a metal hydride.

The mesh structure is characterized by the formation of webs and voids, or pores, 11a. The webs are thereby made of matrix material. A particularly preferred mesh structure is a foam structure in which the pores are preferably designed to be open and preferably form channels.

A metal hydride 12 is fixed in the mesh structure of the matrix material 11. The metal hydride 12 may itself be bound in the pores 11a or the mesh structure of the matrix material 11, wherein the latter is preferred. If the metal hydride 12 is incorporated into the mesh structure, it may be fixed to the webs and/or the node points of the matrix material 11. If the matrix material 11 itself is a metal hydride 12, the particulate metal hydride 12 is preferably present in the pores 11a of the matrix material 11. The metal hydride 12 is present as an accumulation of multiple metal hydride particles 13 that are in turn densely packed.

If the initially unloaded storage material made of matrix material 11 and metal hydride 12 (FIG. 2) is charged with molecular hydrogen 14, the hydrogen 14 penetrates through the matrix material 11 and is bound by the metal hydride 12. Molecular hydrogen 14 is additionally bound in the pores 11a and interstices of the matrix material 12. In the loaded state, the hydrogen 14 is present as hydrogen 16 bound in the metal hydride 12 and hydrogen 15 bound in the pores 11a of the metal hydride 12.

The storage density or energy density may be increased depending on the pressure ratios. If the pressure in the hydrogen pressure tank 10 is increased, the matrix material 11 is on the one hand compressed. The pores 11a become smaller, and the quantity of matrix material 11—and therefore of stabilized metal hydride 12 in the matrix material 11—may therefore be increased. In other words, the gravimetric storage density or energy density increases. However, the pressure increase does not lead to an absolute compression in which interstices are no longer present. Even at high pressures, an unfilled portion accordingly remains in the hydrogen pressure tank. This is filled with hydrogen 15. With increased pressure, the hydrogen 15 is also compressed up to the point of liquefaction or to a critical state, such that more molecular hydrogen per volume unit is bound in the pores 11a. In other words, the volumetric energy density or storage density also increases. In the hydrogen storage tank according to the invention, the volumetric energy density and the gravimetric energy density are thus increased simultaneously, whereas either the gravimetric energy density or the volumetric energy density are optimized in conventional storage tanks. The hydrogen pressure tank 10 according to the invention thus shows an increased storage capability in comparison to the prior art.

FIG. 3 shows the influence of the pressure increase on the two described energy densities, depending on the composition of the matrix material 11.

FIG. 4 shows various compositions in which the ratio of metal hydride bound in matrix material to pure metal hydride was varied over the levels 0% (._._.), 25% (_) 50%(. . . .); 75% (- - -), and finally up to matrix material substituted by metal hydride (_) thus matrix material present as metal hydride. The matrix material is thereby always present in an open-pored foam structure. The energy density of pure, compressed hydrogen (o) and a pure metal hydride storage (+) are additionally compared.

If starting from classical pressure vessels, the curves depicted in FIG. 3 result with variation of the storage pressure, of the foam density/pore size, and of the fill degree of the foam structure with MH. It is thereby clearly apparent that, with the typical metal hydride storages currently on the market, a simultaneous increase of the volumetric energy density and gravimetric energy density in comparison to a pure pressurized gas tank results only in the lower pressure range (here less than or equal to 10 MPa). The embodiment of a hydrogen pressure tank according to the invention with metal hydride bound in matrix material, given simultaneous use of the interstices as a hydrogen storage under pressure, leads to markedly increased energy densities both volumetrically and gravimetrically. Increases in the energy densities up to 35 MPa are achieved via the use of the pressure storages according to the invention, lighter $H_2$-matrix structures (for example as a metal hydride), and the targeted utilization of the foam structure as a stable matrix in a cylinder.

LIST OF REFERENCE SYMBOLS 10 hydrogen pressure tank
11 matrix material
11a pores in the matrix material
12 metal hydride
13 metal hydride particles
14 molecular hydrogen
15 hydrogen bound in the metal hydride
16 hydrogen stored in the pores or interstices of the matrix material

The invention claimed is:

1. A hydrogen pressure tank to provide hydrogen for a fuel cell system, the hydrogen pressure tank comprising:
    a pressure-resistant storage container;
    a first metal hydride arranged inside the storage container to bond hydrogen; and
    a polymer matrix material comprising an elastomer mesh having a three-dimensional webbed structure that includes webs and node points,
    wherein the first metal hydride is bound to the webs, the node points, or both.

2. The hydrogen pressure tank according to claim 1, wherein the matrix material is permeable to hydrogen.

3. The hydrogen pressure tank according to claim 1, wherein the hydrogen pressure tank is under pressure in a range from 10 MPa to 70 MPa.

4. The hydrogen pressure tank according to claim 3, wherein the pressure is in a range from 35 MPa to 70 MPa.

5. A fuel cell system, comprising:
    a hydrogen pressure tank including:
        a pressure-resistant storage container;
        a first metal hydride arranged inside the storage container to bond hydrogen; and
        a polymer matrix material comprising an elastomer mesh having a three-dimensional webbed structure that includes webs and node points,
        wherein the first metal hydride is bound to the webs, the node points, or both.

6. The fuel cell system according to claim 5, wherein the matrix material is permeable to hydrogen.

7. A motor vehicle, comprising:
a fuel cell system including a hydrogen pressure tank including:
  a pressure-resistant storage container;
  a first metal hydride arranged inside the storage container to bond hydrogen; and
  a polymer matrix material comprising an elastomer mesh having a three-dimensional webbed structure that includes webs and node points,
  wherein the first metal hydride is bound to the webs, the node points, or both.

8. The hydrogen pressure tank according to claim 1, wherein the first metal hydride is sodium aluminum hydride.

* * * * *